(12) United States Patent
Ohara (10) Patent No.: US 10,857,699 B2
(45) Date of Patent: Dec. 8, 2020

(54) TIRE VULCANIZATION MOLD AND METHOD FOR MANUFACTURING PNEUMATIC TIRE

(71) Applicant: Toyo Tire Corporation, Itami (JP)

(72) Inventor: Masaaki Ohara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/407,514

(22) Filed: May 9, 2019

(65) Prior Publication Data

US 2019/0366592 A1 Dec. 5, 2019

(30) Foreign Application Priority Data

May 31, 2018 (JP) .................... 2018-104553

(51) Int. Cl.
*B29D 30/06* (2006.01)
*B29C 33/10* (2006.01)

(52) U.S. Cl.
CPC .......... *B29C 33/10* (2013.01); *B29D 30/0606* (2013.01); *B29D 2030/0612* (2013.01); *B29D 2030/0617* (2013.01)

(58) Field of Classification Search
CPC ........ B29D 30/0606; B29D 2030/0617; B29C 33/10
See application file for complete search history.

(56) References Cited

U.S. PATENT DOCUMENTS

| 9,186,857 | B2 * | 11/2015 | Ohara | B29D 30/0606 |
| 9,873,234 | B2 * | 1/2018 | Ohara | B29D 30/0606 |
| 10,144,188 | B2 * | 12/2018 | Ando | B29D 30/0606 |
| 10,456,952 | B2 * | 10/2019 | Ando | B29C 37/0053 |
| 2017/0173905 | A1 | 6/2017 | Ando | |

FOREIGN PATENT DOCUMENTS

JP 2017-113895 A 6/2017

* cited by examiner

*Primary Examiner* — James P Mackey
(74) *Attorney, Agent, or Firm* — Westerman, Hattori, Daniels & Adrian, LLP (57) ABSTRACT

The tire vulcanization mold includes a molding surface for molding a tire surface of a pneumatic tire set in a cavity, a concave portion provided on the molding surface, and a vent plug provided in the concave portion. The vent plug includes a housing having a cylindrical shape and including an exhaust passage, a stem that is inserted in the housing and configured to open and close the exhaust passage of the housing, and an urging member urging the stem toward the cavity side. The concave portion has a narrow portion having a width substantially equal to the outer diameter of the housing of the vent plug, and the vent plug is disposed in the narrow portion.

5 Claims, 6 Drawing Sheets

WIDTH DIRECTION OF RECESSED GROOVE

Fig. 5

WIDTH DIRECTION OF RECESSED GROOVE

TIRE VULCANIZATION MOLD AND METHOD FOR MANUFACTURING PNEUMATIC TIRE

CROSS-REFERENCE TO RELATED APPLICATIONS

This application claims priority of Japanese Patent Application No.: 2018-104553 filed on May 31, 2018, the content of which is incorporated herein by reference.

BACKGROUND OF THE INVENTION

Technical Field

The present invention relates to a tire vulcanization mold and a method for manufacturing a pneumatic tire.

Related Art

There has been known a tire vulcanization mold in which a vent hole is formed on a molding surface for molding a tire surface and a vent plug is fitted in the vent hole. During vulcanization molding, air interposed between the molding surface and the tire surface is discharged from the vent plug.

SUMMARY

There has been known a spring vent which includes: a housing having a cylindrical shape and including an exhaust passage; a stem having, at an end portion on a molding surface side, a valve body that is inserted into the housing and configured to open and close the exhaust passage; and urging means urging the stem toward the molding surface side (see, for example, Japanese Unexamined Patent Publication No. 2017-113895). This spring vent becomes an open state by the urging means urging the stem toward the molding surface side and becomes a closed state by the tire surface pushing the stem during vulcanization molding.

In a tire vulcanization mold provided with the spring vent, there is a problem called biting of rubber in which rubber flows into the exhaust passage of the spring vent and rubber remains in the exhaust passage of the spring vent before the spring vent becomes the closed state during vulcanization molding.

An object of the present invention is to provide a tire vulcanization mold and a method for manufacturing a pneumatic tire that can suppress occurrence of biting of rubber in a tire vulcanization mold provided with a spring vent.

A tire vulcanization mold according to one embodiment of the present invention includes a molding surface for molding a tire surface of a pneumatic tire set in a cavity, a concave portion provided on the molding surface, and a vent plug provided in the concave portion, in which: the vent plug includes a housing having a cylindrical shape and including an exhaust passage, a stem that is inserted into the housing and configured to open and close the exhaust passage of the housing, and an urging member for urging the stem toward a cavity side; the concave portion includes a narrow portion having a width substantially equal to an outer diameter of the housing of the vent plug; and the vent plug is disposed in the narrow portion.

According to this configuration, since the vent plug is provided in the narrow portion into which unvulcanized rubber hardly flows in the concave portion at the initial stage during vulcanization molding, the unvulcanized rubber comes into contact with the stem from the cavity side during vulcanization molding. Therefore, it is possible to suppress the unvulcanized rubber from flowing into the exhaust passage of the vent plug in a state where the stem of the vent plug does not close the exhaust passage of the housing, and it is possible to suppress occurrence of biting of rubber during vulcanization molding of the tire.

The width of the narrow portion of the concave portion may be 0.5 times or more and 1.5 times or less the outer diameter of the housing of the vent plug.

According to this configuration, the above invention can be suitably implemented.

The width of the narrow portion of the concave portion may be 1 time or more and 1.5 times or less the outer diameter of the housing of the vent plug.

In the case where the width of the narrow portion of the concave portion is smaller than the outer diameter of the housing of the vent plug, a part of a projection formed on the pneumatic tire by the narrow portion of the concave portion of the tire vulcanization mold is formed swollen so as to correspond to the outer shape of the vent plug, so that the appearance quality of the pneumatic tire deteriorates. Therefore, deterioration of the appearance quality of the tire can be suppressed by setting the width of the narrow portion of the concave portion to an appropriate range.

The concave portion may have a frame shape surrounding at least one closed region.

The concave portion may have a corner portion and the narrow portion provided with the vent plug may be provided at the corner portion of the concave portion.

Since the unvulcanized rubber during vulcanization molding flows so as to spread toward the corner portion of the concave portion, by disposing the narrow portion provided with the vent plug at the corner portion of the concave portion, air accumulated in the concave portion of the tire vulcanization mold can effectively be discharged to the outside of the tire vulcanization mold.

A method for manufacturing a pneumatic tire according to another embodiment of the present invention includes a step of setting a green tire in the tire vulcanization mold and heating and pressurizing the green tire to perform vulcanization.

According to this tire manufacturing method, occurrence of biting of rubber can be suppressed in a tire vulcanization mold provided with a vent plug.

According to the present invention, occurrence of biting of rubber can be suppressed in a tire vulcanization mold provided with a spring vent.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments according to the present invention will be described with reference to attached drawings. It should be noted that the following description is merely exemplary in nature and is not intended to limit the present invention, its application, or its use. In addition, the drawings are schematic, ratios of dimensions and the like are different from actual ones.

Figure 1:
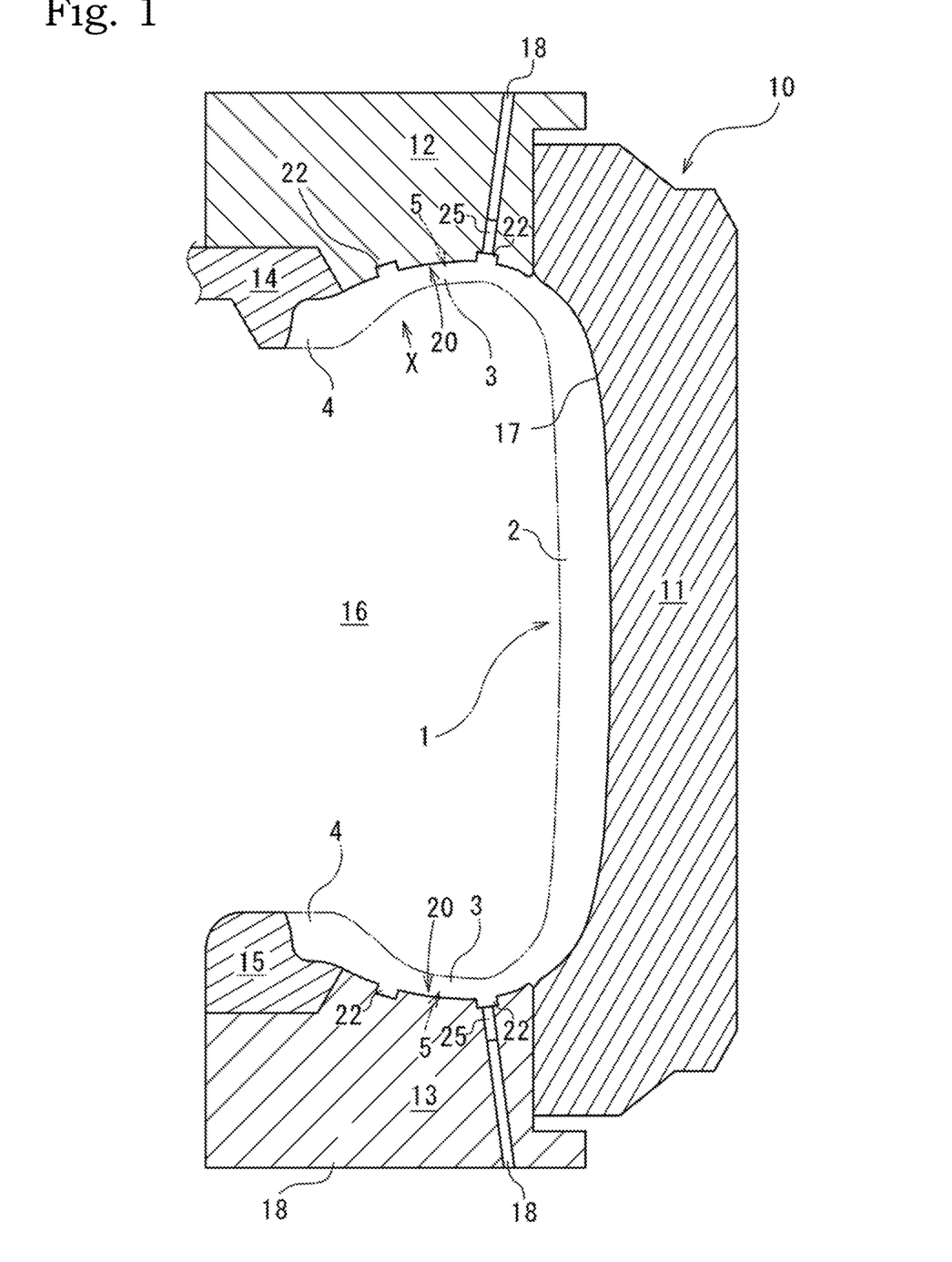
FIG. 1 is a cross-sectional view showing a schematic configuration of a tire vulcanization mold according to an embodiment of the present invention.

FIG. 1 is a cross-sectional view showing a schematic configuration of a tire vulcanization mold 10 according to one embodiment of the present invention, showing only one side (the right side in FIG. 1) in a tire radial direction. In FIG. 1, a pneumatic tire 1 to be vulcanized and molded in the tire vulcanization mold 10 is shown together with a virtual line (two-dot chain line). The pneumatic tire 1 is manufactured such that a green tire is set in the tire vulcanization mold 10 so that the tire axis is directed toward a vertical direction, and is subjected to vulcanization molding.

As shown in FIG. 1, the tire vulcanization mold 10 includes an annular sector mold 11, a pair of upper and lower side plates 12, 13 located on the inner diameter side, and a pair of upper and lower bead rings 14, 15 located on the further inner diameter side, and is configured as a so-called segmented mold in which a cavity 16 in which the pneumatic tire 1 is vulcanized and molded is defined inside these.

The inner wall surfaces, which define the cavity 16, of the sector mold 11, the side plates 12, 13, and the bead rings 14, 15 are formed as a molding surface 17 for vulcanization molding a tread portion 2, a sidewall portion 3, and a bead portion 4 of the pneumatic tire 1, respectively.

A vent hole 18 is formed in each of the side plates 12, 13 so as to extend from the molding surface 17 in the direction perpendicular to the surface and pass through to the outside of the tire vulcanization mold 10. In the vent hole 18, a spring vent 25 (vent plug) is fitted in an end portion on the cavity 16 side.

On the molding surface 17 in each of the side plates 12, 13, a mark forming portion 20 for vulcanization molding a mark 5 on the sidewall portion 3 of the pneumatic tire 1 is formed. The vent hole 18 is formed in a concave portion 22 of the mark forming portion 20 to be described later and discharges the air accumulated in the concave portion 22 during vulcanization molding to the outside of the tire vulcanization mold 10.

Figure 2:
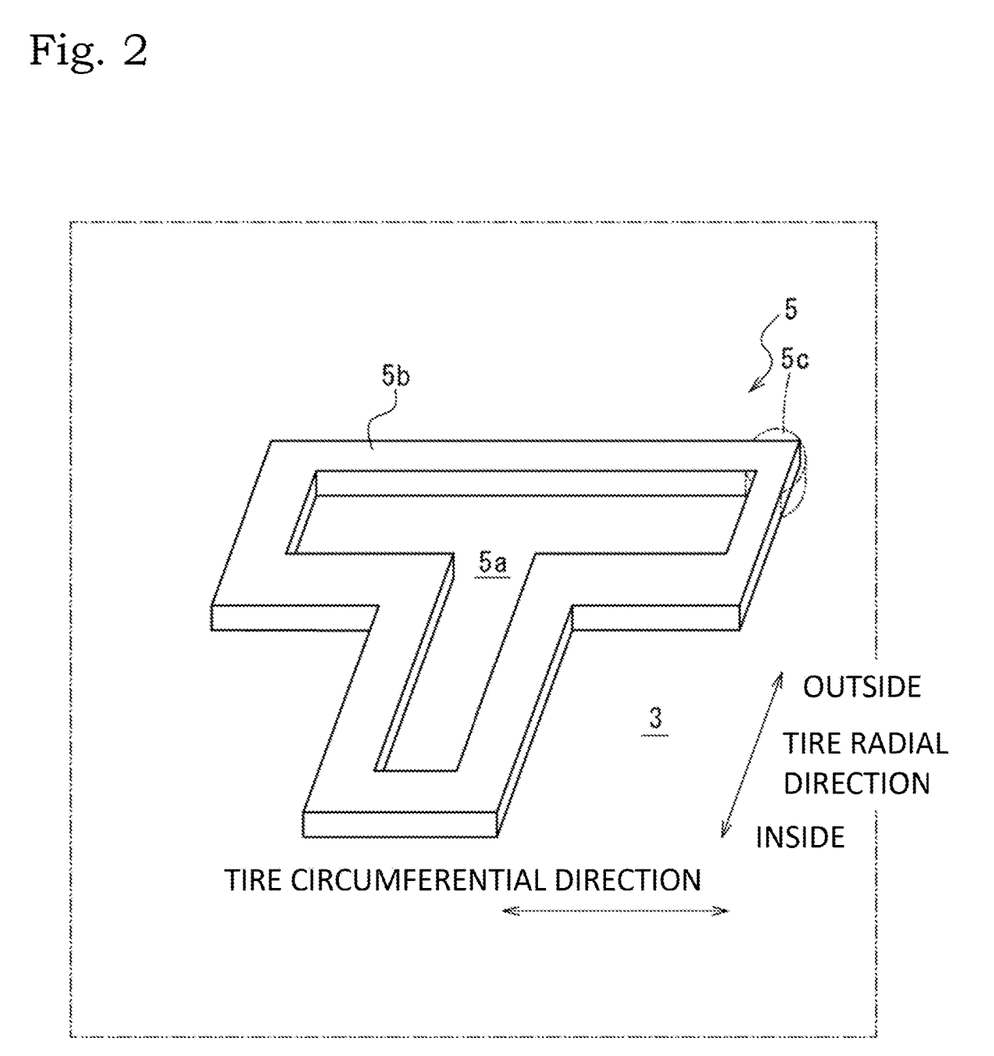
FIG. 2 is a view schematically showing a mark formed on a sidewall portion of a tire by a tire vulcanization mold.

FIG. 2 is a perspective view of the mark 5 formed on the sidewall portion 3 of the pneumatic tire 1 by the tire vulcanization mold 10 of the present embodiment.

Referring to FIG. 2, the mark 5 of the present embodiment has a shape corresponding to "T" of the alphabet capital letter. Specifically, the mark 5 has a mark main body 5a representing the letter "T" and a projection 5b provided so as to protrude from the outer surface of the sidewall portion 3 so as to border the mark main body 5a. Here, the mark 5 may be either a letter, a figure, or a symbol, or a combination thereof. For example, the character represented by the mark 5 is not limited to "T" of the alphabet capital letter.

Figure 3:
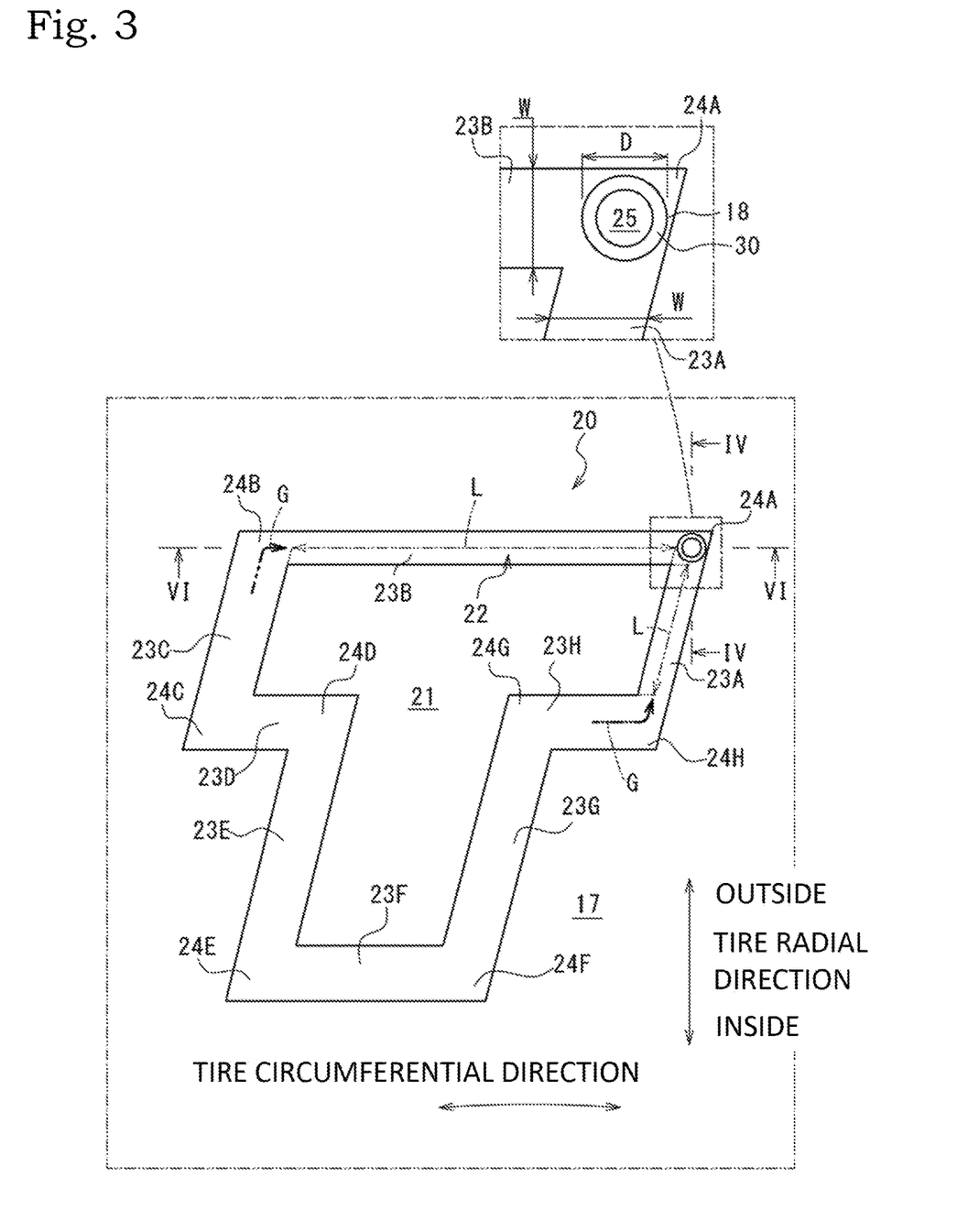
FIG. 3 is a view showing a molding surface of the tire vulcanization mold as viewed in a direction of arrow X in FIG. 1.

FIG. 3 is a view showing the mark forming portion 20 formed on the molding surface 17 of the side plate 12 as viewed in the direction of arrow X in FIG. 1.

As shown in FIG. 3, the mark forming portion 20 includes a mark molding surface 21 representing the letter "T" and the concave portion 22 provided to be recessed on the molding surface 17 of the tire vulcanization mold 10 so as to border the mark molding surface 21. That is, the concave portion 22 has a frame shape surrounding the mark molding surface 21 which is a closed region. The mark molding surface 21 of the mark forming portion 20 forms the mark main body 5a (shown in FIG. 2) of the mark 5 on the sidewall portion 3 of the pneumatic tire 1 during vulcanization molding, and the concave portion 22 of the mark forming portion 20 forms the projection 5b (shown in FIG. 2) of the mark 5 on the sidewall portion 3 of the pneumatic tire 1 during vulcanization molding.

The concave portion 22 has a plurality of (eight in the present embodiment) recessed grooves 23A to 23H provided to be recessed from the molding surface 17 of the tire vulcanization mold 10 and extending substantially linearly, and a plurality of (eight in the present embodiment) corner portions 24A to 24H in which two of the recessed grooves 23A to 23H are bent and continued. Each of the recessed grooves 23A to 23H of the present embodiment has a uniform width over the direction in which each of the recessed grooves 23A to 23H extends. Among the recessed grooves 23A to 23H of the present embodiment, the width of the recessed grooves 23A and 23B is smaller than the width of the recessed grooves 23C to 23H. Specifically, the recessed grooves 23A and 23B are narrow portions having a width W substantially equal to an outer diameter D of a housing 30 of the spring vent 25. Therefore, the corner portion 24A in which the two recessed grooves 23A and 23B are bent and continued is also a narrow portion. That is, the concave portion 22 of the present embodiment has a narrow portion constituted by the recessed grooves 23A, 23B and the corner portion 24A.

As described above, the vent hole 18 is provided in the concave portion 22 of the tire vulcanization mold 10. Specifically, the vent hole 18 is provided at the corner portion 24A which is the narrow portion of the concave portion 22. That is, the spring vent 25 fitted into the vent hole 18 is disposed at the corner portion 24A which is the narrow portion of the concave portion 22 of the tire vulcanization mold 10.

Figure 4:
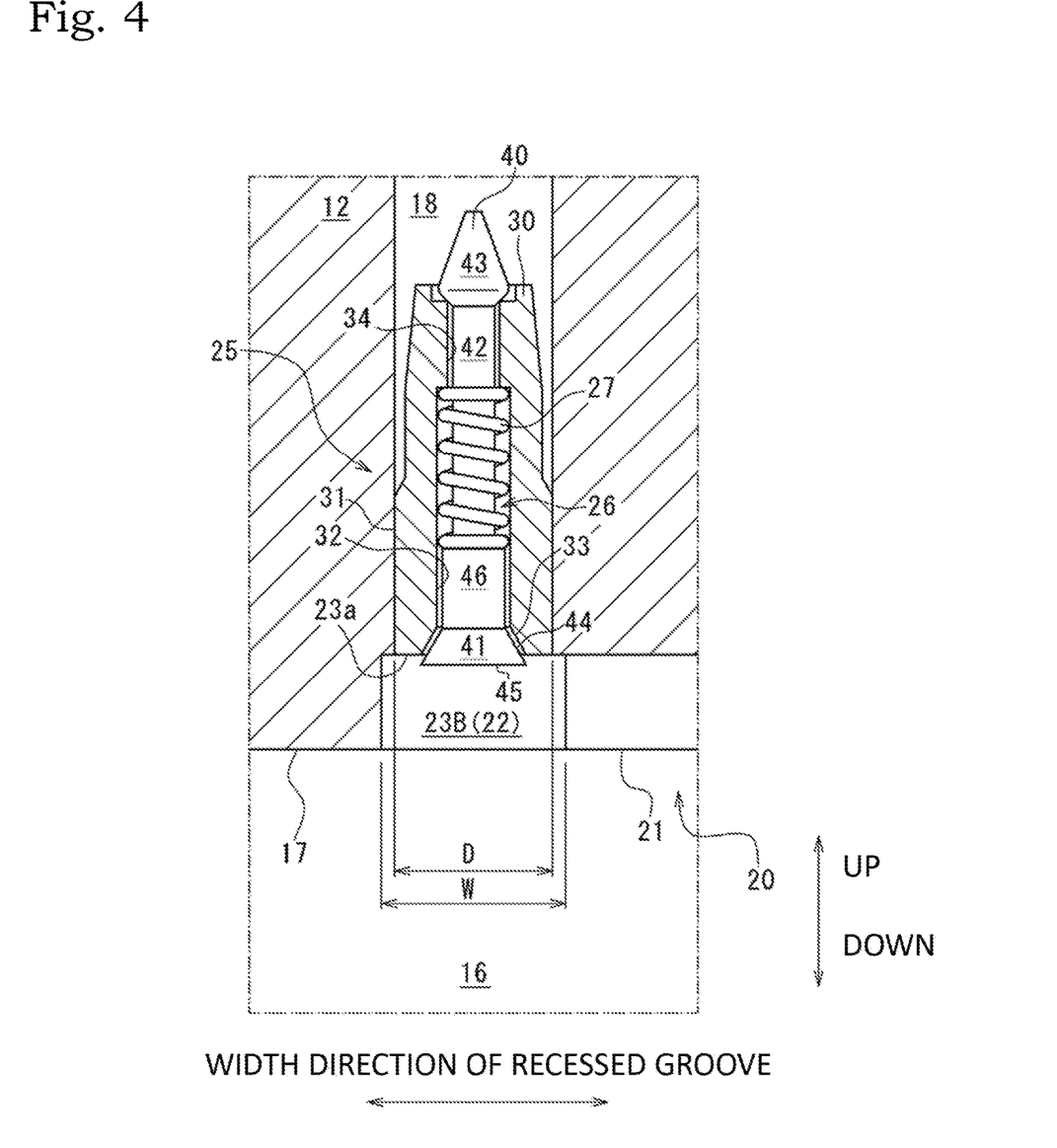
FIG. 4 is a cross-sectional view taken along line IV-IV in FIG. 3.

FIG. 4 is a cross-sectional view taken along line IV-IV in FIG. 3, showing a longitudinal section of the vent hole 18 formed at the corner portion 24A of the concave portion 22 and the spring vent 25 fitted therein. Note that, the vent hole 18 is formed such that the center axis thereof coincides with the groove center in each of the recessed grooves 23A, 23B. For convenience of explanation, a direction extending from the molding surface 17 of the vent hole 18 in the direction perpendicular to the surface is referred to as a vertical direction, and the cavity 16 side is referred to as a lower side and the opposite side thereof is referred to as an upper side.

As shown in FIG. 4, the spring vent 25 has the cylindrical housing 30 in which an exhaust passage 26 is defined, a stem 40 inserted in the housing 30, and a coil spring (urging member) 27 urging the stem 40 toward the cavity 16 side.

The housing 30 is fitted and held in the vent hole 18 at an outer peripheral portion 31. The housing 30 is formed with an inner peripheral portion 32 passing therethrough in the axial direction, and the inner peripheral portion 32 constitutes the exhaust passage 26. A tapered surface 33 which is expanded downward in a conical shape is formed in an opening located at the lower end of the inner peripheral portion 32 and a reduced diameter portion 34 of reduced diameter is formed in the upper portion.

The stem 40 has a valve body 41 located at the lower end portion, a shaft portion 42 extending upward from the upper end portion, and a stopper 43 located at the upper end portion. The valve body 41 is formed in a truncated cone shape whose diameter increases downward, and a side face portion 44 extends in parallel to the tapered surface 33 of the housing 30.

At the lower portion of the shaft portion 42, a large diameter portion 46 having an outer diameter larger than that of the upper portion is formed. A coil spring 27 is elastically provided between the large diameter portion 46 and the reduced diameter portion 34 of the inner peripheral portion 32 around the shaft portion 42. The stopper 43 is positioned above the reduced diameter portion 34 and the outer diameter thereof is larger than the inner diameter of the reduced diameter portion 34. The downward movement of the stem 40 is restricted by the reduced diameter portion 34 in the stopper 43, so that the stem 40 is prevented from coming out toward the cavity 16 side.

When the stem 40 is pushed upward against the urging force of the coil spring 27 due to the flow of the rubber of the green tire to be vulcanized and molded, the side face portion 44 of the valve body 41 and the tapered surface 33 of the housing 30 abut on a plane with each other, so that a sealing portion that closes the exhaust passage 26 is formed therebetween.

With the valve body 41 abutted on the tapered surface 33, a stem top surface 45 at the lower end of the stem 40 is flush with a housing top surface 35 at the lower end of the housing 30, and over the entire vertical direction of the tapered surface 33, a sealing portion is formed between the tapered surface 33 and the valve body 41.

As shown in FIGS. 3 and 4, the width W of the recessed groove 23A, 23B which are the narrow portion is substantially equal to the outer diameter D of the housing 30 of the spring vent 25. Specifically, the width W of the recessed groove 23A, 23B of the concave portion 22 is set to 0.5 times or more and 1.5 times or less the outer diameter D of the housing 30. Considering the appearance performance of the mark 5 (shown in FIG. 1) formed on the sidewall portion 3 of the pneumatic tire 1, the width W of the recessed groove 23A, 23B of the concave portion 22 is preferably set to 1 time or more and 1.5 times or less the outer diameter D of the housing 30.

It is preferable that a length L in a direction (extending direction) in which the recessed groove 23A, 23B as the narrow portion extends is five times or more the outer diameter D of the housing 30.

Flow of Unvulcanized Rubber During Vulcanization Molding

Figure 5:
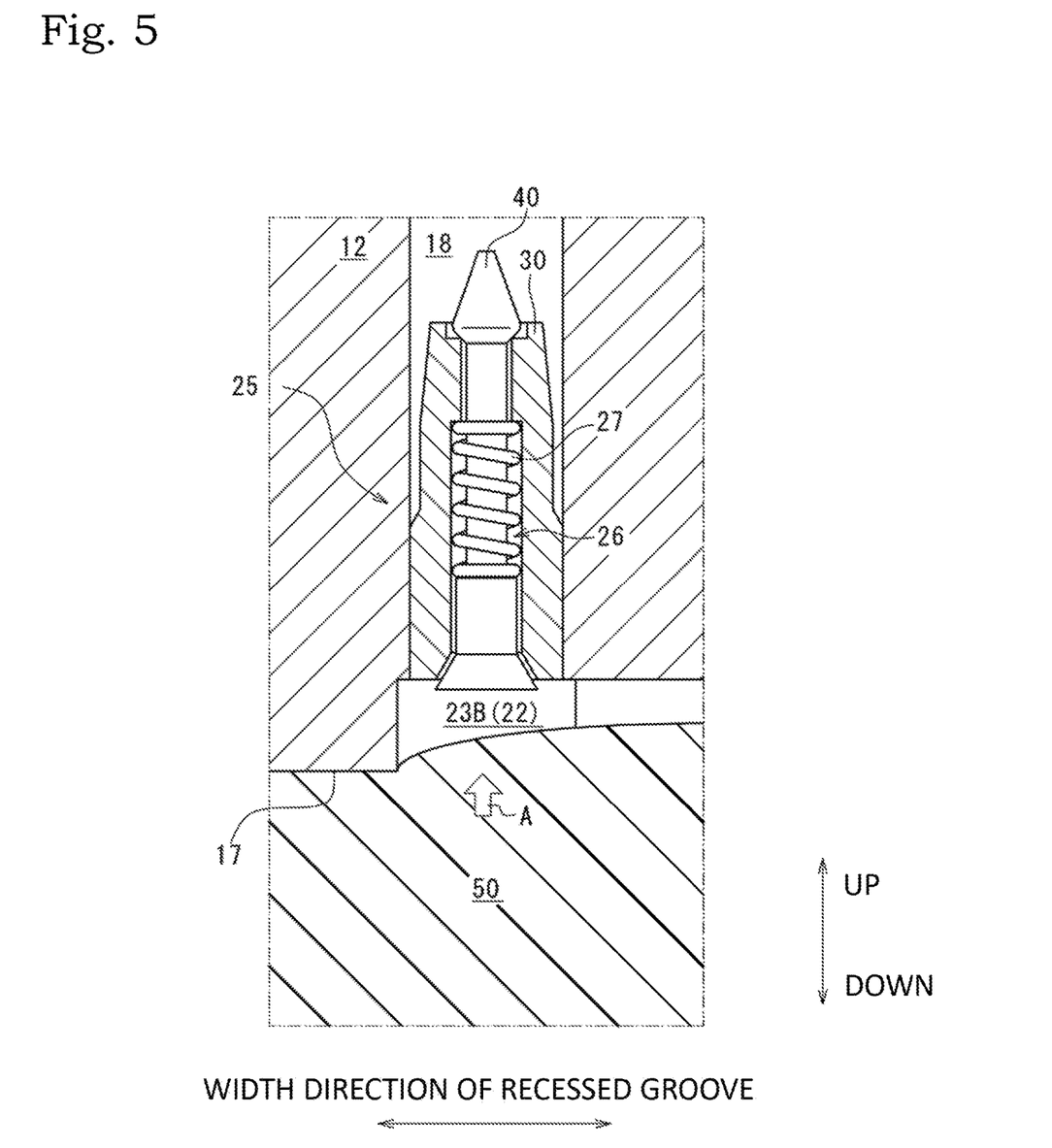
FIG. 5 is a cross-sectional view similar to FIG. 4 showing the flow of unvulcanized rubber during vulcanization molding.
Figure 6:
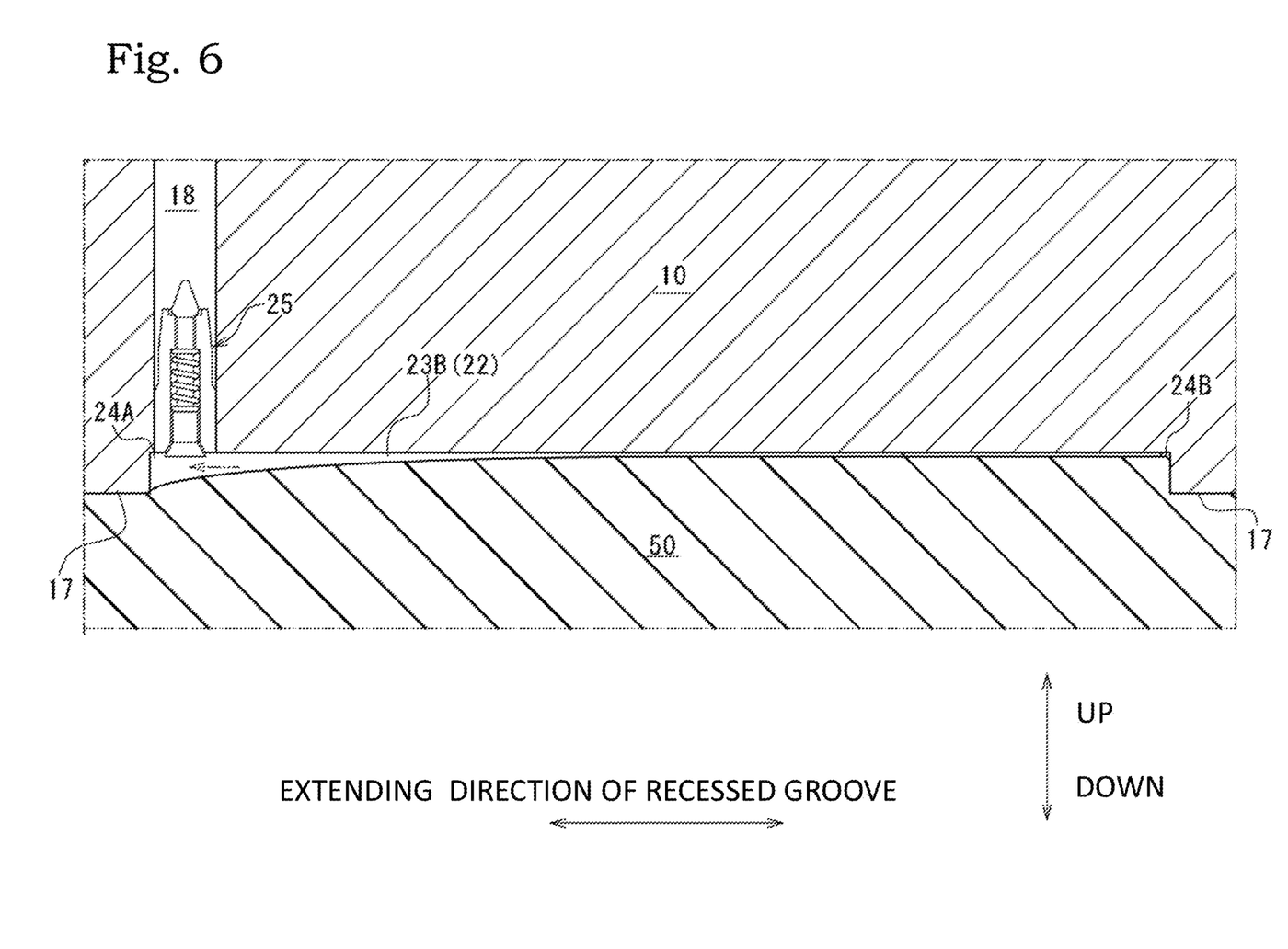
FIG. 6 is a cross-sectional view taken along the line VI-VI of FIG. 3 and showing the flow of unvulcanized rubber during vulcanization molding.

Hereinafter, the flow of the unvulcanized rubber during vulcanization molding will be described with reference to FIGS. 3, 5 and 6. FIG. 5 is a cross-sectional view similar to FIG. 3 showing the flow of unvulcanized rubber during vulcanization molding. FIG. 6 is a cross-sectional view taken along the line VI-VI of FIG. 3, showing the flow of unvulcanized rubber during vulcanization molding. For convenience of description, a direction extending from the molding surface 17 of the vent hole 18 in the direction perpendicular to the surface is referred to as a vertical direction, and the cavity 16 (shown in FIG. 1) side is referred to as a lower side and the opposite side thereof is referred to as an upper side.

Referring to FIGS. 5 and 6, an unvulcanized rubber 50 during vulcanization molding first comes into contact with the molding surface 17 from the cavity 16 side, and then flows into the concave portion 22.

Specifically, at the initial stage during vulcanization molding, the unvulcanized rubber 50 flows into the recessed grooves 23C to 23H in the concave portion 22. In other words, at the initial stage during vulcanization molding, the unvulcanized rubber 50 flows into a portion other than the recessed groove 23A, 23B as the narrow portion of the concave portion 22, into which the unvulcanized rubber 50 hardly flows.

Further, the flow of the unvulcanized rubber 50 (refer to the two-dot chain line arrow G in the figure), which tends to move from the recessed grooves 23C to 23H to the spring vent 25, is hard to reach the spring vent 25 by the recessed groove 23A, 23B as the narrow portion.

Thereafter, as shown in FIG. 5, the unvulcanized rubber 50 flows from the cavity 16 (shown in FIG. 3) side toward the spring vent 25 (see arrow A in FIG. 5). That is, the unvulcanized rubber 50 is brought into contact with the stem 40 of the spring vent 25 from the cavity 16 (shown in FIG. 3) side so as to push up the stem 40 to bring the spring vent 25 into a closed state.

At this time, as shown in FIG. 6, the unvulcanized rubber 50 having flown into the recessed groove 23B, which is the narrow portion of the concave portion 22, flows from the corner portion 24B side to the corner portion 24A side, which is the narrow portion. Therefore, the air accumulated in the concave portion 22 flows from the corner portion 24B side to the corner portion 24A side (see the two-dot chain line in the figure). In this cross section, the spring vent 25 is disposed at the corner portion 24A, and the air flowing toward the corner portion 24A in the recessed groove 23B is discharged from the spring vent 25 disposed at the corner portion 24A to the outside of the tire vulcanization mold 10 via the vent hole 18.

According to the tire vulcanization mold 10 described above, since the spring vent 25 is provided at the corner portion 24A which is a narrow portion into which the unvulcanized rubber 50 hardly flows in the concave portion 22 at the initial stage during vulcanization molding, the unvulcanized rubber 50 comes into contact with the stem 40 from the cavity 16 side during vulcanization molding. Therefore, the unvulcanized rubber 50 can be prevented from flowing into the exhaust passage 26 of the spring vent 25 in a state where the stem 40 of the spring vent 25 does not close the exhaust passage 26 of the housing 30, and occurrence of biting of rubber during vulcanization molding of the pneumatic tire 1 can be suppressed.

When the width W of the recessed groove 23A, 23B which is the narrow portion of the concave portion 22 is smaller than the outer diameter D of the housing 30 of the spring vent 25, a swelling portion 5c (See FIG. 2) that swells so as to correspond to the outer shape of the spring vent 25 is formed on the projection 5b of the mark 5, so that the appearance quality of the tire deteriorates. Therefore, by setting the width W of the recessed groove 23A, 23B, which are the narrow portion of the concave portion 22, to an appropriate range (1 time or more and 1.5 times or less the outer diameter D of the housing 30), it is possible to suppress deterioration of the appearance quality of the pneumatic tire 1.

Further, since the unvulcanized rubber 50 during vulcanization molding tends to accumulate at the corner portion 24A, the spring vent 25 is disposed at the corner portion 24A which is a narrow portion of the concave portion 22, so that air accumulated in the concave portion 22 of the tire vulcanization mold 10 can efficiently be discharged to the outside of the tire vulcanization mold 10.

In this embodiment, one recessed groove 23B extending in the tire circumferential direction has been described, but the present invention is not limited thereto, and the recessed groove 23A which is a narrow portion has the same configuration.

Although the specific embodiments of the present invention have been described above, the present invention is not limited to the above-described embodiments, and various modifications can be made within the scope of the present invention.

In the above embodiment, the concave portion 22 is for forming the mark 5 on the sidewall portion 3 of the pneumatic tire 1, but it is not limited to this, and for example, the concave portion 22 may be for forming a stone ejector in the tread portion 2.

In the above-described embodiment, the whole of the concave portion 22 is constituted by narrow portions, but the present invention is not limited to this. A part of the concave portion 22 may be a narrow portion, and the spring vent 25 may be disposed in the narrow portion.

In the above-described embodiment, a part of the concave portion 22 is constituted by narrow portions, but the present invention is not limited to this, and the whole of the concave portion 22 may be narrow portions.

Further, in the above embodiment, the spring vent 25 is disposed at the corner portion 24A, but the present invention is not limited to this, and the spring vent 25 may be disposed at an intermediate portion of the recessed groove 23A or at an intermediate portion of the recessed groove 23B.

In the above embodiment, the number of the spring vents 25 is one, but the number of the spring vents 25 is not limited thereto, and may be two or more.

The urging member of the spring vent 25 is not limited to the coil spring, but may be another component such as a disc spring or a leaf spring.

The tire vulcanization mold 10 is not limited to the segmented mold but may be a so-called two-piece mold.

What is claimed is:

1. A tire vulcanization mold comprising:
   a molding surface for molding a tire surface of a pneumatic tire set in a cavity;
   a concave portion provided on the molding surface; and
   a vent plug provided in the concave portion,
   wherein
   the vent plug includes:
   a housing having a cylindrical shape and including an exhaust passage;
   a stem that is inserted into the housing and configured to open and close the exhaust passage of the housing, and
   an urging member for urging the stem toward a cavity side,
   the concave portion includes a first portion and a second portion, the second portion having a width narrower than the first portion and 1 time or more and 1.5 times or less an outer diameter of the housing of the vent plug, and
   the vent plug is disposed in the second portion.

2. The tire vulcanization mold according to claim 1, wherein the concave portion has a frame shape surrounding at least one closed region.

3. The tire vulcanization mold according to claim 2, wherein
   the concave portion has a corner portion, and
   the second portion provided with the vent plug is provided at the corner portion of the concave portion.

4. The tire vulcanization mold according to claim 1, wherein the second portion includes a first sub-portion and a second sub-portion, a terminal end portion of the first sub-portion and a terminal end portion of the second sub-portion is connected with each other to define a corner portion, and the vent plug is disposed directly at the corner portion.

5. A method for manufacturing a pneumatic tire, the method comprising a step of setting a green tire in a tire vulcanization mold according to claim 1 and heating and pressurizing the green tire to perform vulcanization.

* * * * *